(12) United States Patent
Transseau

(10) Patent No.: US 8,452,432 B2
(45) Date of Patent: May 28, 2013

(54) REALTIME EDITING AND PERFORMANCE OF DIGITAL AUDIO TRACKS

(76) Inventor: Brian Transeau, Rockville, MD (US)

(*) Notice: Subject to any disclaimer, the term of this patent is extended or adjusted under 35 U.S.C. 154(b) by 599 days.

(21) Appl. No.: 12/652,011

(22) Filed: Jan. 4, 2010

(65) Prior Publication Data

US 2010/0204811 A1    Aug. 12, 2010

Related U.S. Application Data

(63) Continuation of application No. 12/485,815, filed on Jun. 16, 2009, now abandoned, which is a continuation-in-part of application No. 12/330,471, filed on Dec. 8, 2008, now abandoned, which is a continuation-in-part of application No. 11/551,696, filed on Oct. 20, 2006, now Pat. No. 7,935,879, and a continuation-in-part of application No. 11/807,214, filed on May 25, 2007, now Pat. No. 8,145,496.

(60) Provisional application No. 60/992,753, filed on Dec. 6, 2007, provisional application No. 61/012,417, filed on Dec. 7, 2007, provisional application No. 60/803,210, filed on May 25, 2006.

(51) Int. Cl.
  *G06F 17/00* (2006.01)
  *H03G 3/00* (2006.01)
  *H04B 1/00* (2006.01)
  *H04B 1/20* (2006.01)

(52) U.S. Cl.
  USPC .................. 700/94; 381/61; 381/119; 369/4

(58) Field of Classification Search
  USPC ................. 700/94; 381/61, 62, 119; 369/1–4
  See application file for complete search history.

(56) References Cited

U.S. PATENT DOCUMENTS

| | | | | |
|---|---|---|---|---|
| 7,343,210 B2* | 3/2008 | DeVito et al. | ................... | 700/94 |
| 2002/0016643 A1* | 2/2002 | Sakata | ................ | 700/94 |
| 2004/0089141 A1* | 5/2004 | Georges et al. | ............. | 84/609 |
| 2006/0000344 A1* | 1/2006 | Basu | ................... | 84/612 |
| 2006/0195869 A1* | 8/2006 | Holm et al. | ................... | 725/60 |

* cited by examiner

*Primary Examiner* — Andrew C Flanders
*Assistant Examiner* — Daniel Sellers
(74) *Attorney, Agent, or Firm* — Berliner & Associates

(57) ABSTRACT

A user-friendly system for real time performance and user modification of one or more previously recorded musical compositions facilitates user involvement in the creative process of a new composition that reflects the user's personal style and musical tastes. Such a system may be implemented in a small portable electronic device such as a handheld smartphone that includes a stored library of musical material including original and alternative versions of each of several different components of a common original musical composition, and a graphic user interface that allows the user to select at different times while that original composition is being performed, which versions of which components are to be incorporated to thereby create in real time a new performance that includes elements of the original performance, preferably enhanced at various times with user selected digital sound effects including stuttering and filtering. The system may also optionally comprise a visualizer module that renders a visual animation that is responsive to at least the rhythm and amplitude of the system's audio output, not only for entertainment value but also to provide visual feedback for the user.

16 Claims, 4 Drawing Sheets

REALTIME EDITING AND PERFORMANCE OF DIGITAL AUDIO TRACKS

CROSS REFERENCE TO RELATED APPLICATIONS

This application is a continuation of co-pending pending non-provisional application Ser. No. 12/485,815, which is a continuation in part of co-pending non-provisional application Ser. No. 12/330,471 (8 Dec. 2008) entitled "Computerized System for Performing, Editing and Sharing Synchronized Audio and Video Tracks". Ser. No. 12/330,471 claims priority from provisional application 60/992,753 (6 Dec. 2007) entitled "Multitrack Audio File Format with Musical Metadata" and also claims priority from provisional application 61/012,417 (7 Dec. 2007) entitled "Synchronized Editing of Audio and Video Streams". Ser. No. 12/330,471 is a continuation in part of copending application Ser. No. 11/551,696 (20 Oct. 2006) entitled "Method and Apparatus for Digital Audio Generation and Manipulation" (published as US2008/0184868), and is also a continuation in part of copending application U.S. Ser. No. 11/807,214 (25 May 2007) entitled "Time Varying Processing of Repeated Digital Audio Samples in Accordance with a User Defined Effect" which claims priority from provisional application 60/803,210(25 May 2006) entitled "Sound Recording Technique". All of these non-provisional applications and provisional applications are hereby incorporated by reference in their entirety.

BACKGROUND OF THE INVENTION

1. Field of the Invention

The present invention relates generally to digital editing of audio data and, more particularly, to a method and apparatus for realtime remixing, re-recording and/or modified performance of previously recorded digital audio tracks using previously defined effects.

2. Description of the Related Art

"Stutter Edit" refers to an audio editing technique pioneered by Brian Transeau which typically involves the rapid retriggering of one or more selected portions ("sample" or "slice") of a digital audio input and modifying the resulting sound stream with a variety of audio effects, all synchronized to a master tempo. The resultant "Stutter Edit" sound may then be combined with the original and/or other sound sources using commercially available digital mixing and editing tools. Real As disclosed in detail in the referenced co-pending applications, real time production of a complex "stutter-edit" type sound is preferably achieved by defining, beforehand, a "stutter gesture" which determines the many parameters required to produce a desired time varying captured during a subsequent live performance.

"Remixing" refers to the combination of sounds from multiple performances, in which a previously recorded performance (which is typically an edited "mix" of multiple live studio recordings and synthesized digital effects) has been recorded in the form of (or has subsequently been processed to form) multiple component "tracks" that collectively comprise the original performance, and selected portions of some or all of those original tracks are "mixed" with selected portions of other tracks (typically comprising live (acoustic) and synthesized (electronic) inputs from other musicians) to form a new performance which includes identifiable elements from the original performance but now performed in a distinctively different style.

A "disc jockey" (or "DJ") performs real time transitions and other editing of previously recorded performances, sound samples, and individual audio tracks to provide musical entertainment to a live audience over an extended period of time. Depending on the skill of the DJ and the capabilities of his mixing and editing console, the result can range from an unremarkable stream of continuous background music to a constantly changing sequence of ambient sounds, moods, lyrics and rhythms that keeps the audience engaged over a prolonged period of time.

Apple's iPhone is a smartphone that is currently marketed worldwide. Its included hardware includes a two channel audio output system, a touchscreen display that can display complex color images and detect simultaneous touching of two different positions (x-y coordinates), an accelerometer subsystem that can detect the orientation of the display and the amplitude and direction of the smartphone's motion along three perpendicular axes (x-y-z), a Bluetooth subsystem for secure high speed communication with nearby compatible devices, and a wireless communication subsystem for communication over the internet. The iPhone is designed to download and run third party software applications that can take full advantage of the smartphone's hardware capabilities using tools and libraries supplied in a commercially available Software Developer Kit.

SUMMARY OF THE INVENTION

An important objective of the present invention is to provide a user-friendly system for real time performance and user modification of one or more previously recorded musical compositions to thereby involve the user in the creative process of a new composition that reflects the user's personal style and musical tastes.

In one presently preferred embodiment, the system is implemented in a small portable electronic device (such as an Apple iPhone or other smart phone) that has been loaded with a stored library of musical material including original and alternative versions of each of several different components of a common original musical composition, and a graphic user interface that allows the user to select at different times while that original composition is being performed, which versions of which components are to be incorporated to thereby create in real time a new performance that includes elements of the original performance, preferably enhanced at various times with user selected digital sound effects including stuttering and filtering.

The system may also optionally comprise a visualizer module that renders a visual animation that is responsive to at least the rhythm and amplitude of the system's audio output, not only for entertainment value but also to provide visual feedback for the user.

In accordance with certain method aspects of the invention, for each musical composition that is to be modified by the user, the different components of the original composition are individually stored in compressed digital format together with corresponding components of at least two time-synchronized alternative versions. Each such set of stored components is listed on a graphical display together with slider (or other equivalent selection means) having a different position for each version. After the user has selected a particular version of a particular component, the associated stored data is retrieved, decompressed, and inserted into an audio output stream in synchronism with the original composition commencing at a predetermined beat (preferably the next downbeat after the required audio data has been retrieved and decompressed). Other selection means are provided for selecting and controlling specific digital sound effects.

In one specific embodiment, the preferred apparatus includes a touch screen capable of specifying locations along 2 independent axes and an accelerometer array capable of detecting movement in each of 2 directions along each of 3 independent axes (for a total of 6 distinct movements). The touch screen is used to continuously vary relevant parameters for a selected digital filter, while the accelerometers are used to simultaneously specify the timing of the stuttering effect and the selection of a respective set of stutter edit parameters from a library of at least 3 (and preferably at least 6) different available stutter effects. In that specific embodiment, visual feedback verifying the activation of the effect is preferably provided by focusing the displayed animation at the coordinates corresponding to the current parameters of an active filter, with the background color reflecting the timing and gesture of an active stutter.

In an alternative embodiment, at least two such user devices are wirelessly connected, with different designated devices controlling different components and/or effects, thereby permitting multiple users to cooperate in the joint creation of the same shared new performance on each of the devices. In that alternative embodiment, the same overall display format is preferably used on all the active user devices, with the enabled component selection buttons visually distinguished from the disabled component selection buttons; any associated filter or effect controls are preferably operative only on the enabled components.

The novel features which are characteristic of the invention, both as to structure and method of operation thereof, together with further objects and advantages thereof, will be understood from the following description, considered in connection with the accompanying drawing, in which at least one preferred embodiment of the invention is illustrated by way of example. It is to be expressly understood, however, that the drawing is for the purpose of illustration and description only, and is not intended as a definition of the limits of the invention.

DESCRIPTION OF THE PREFERRED EMBODIMENT

A presently preferred implementation is as an option software application on an Apple iPhone or iPod, which is preferably written in a known programming language such as Objective-C and C++ wrapped within Object-C++ and accesses additional functionality from known software libraries such as Open GL ES and iPhone OS 3.0 SDK (C and C++ frameworks). Such an application may be readily written, compiled, and tested using the tutorials and software tools provided by Apple in its iPhone 3.0 Software Developer's Kit (SDK). However, it will be readily apparent to those skilled in the art that the principles underlying the various inventions disclosed herein are not limited to a particular device or operating system, and that some or all of the disclosed functionality can be readily ported to other hardware and software environments, both known and unknown.

Figure 1:
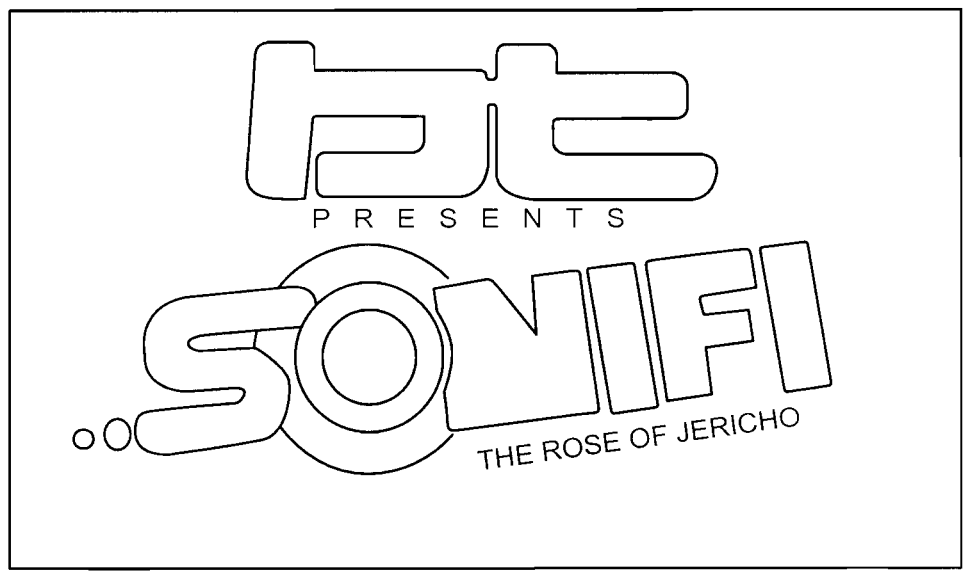
FIG. 1 shows an exemplary splash screen that may displayed as the system is being activated but not yet available for use.
Figure 2:
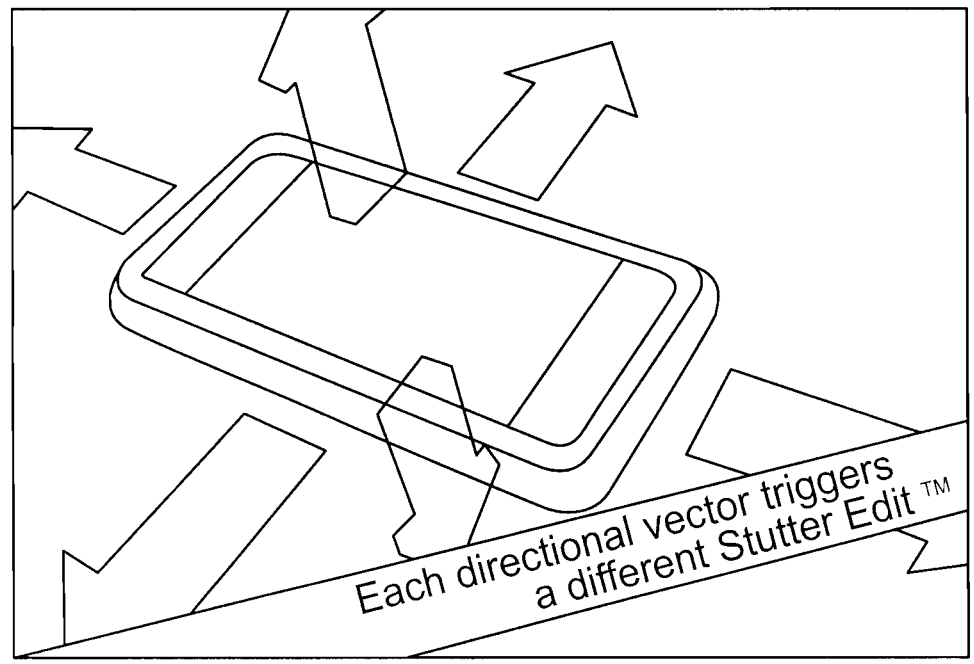
FIG. 2 is a screen shot of an exemplary instructional diagram concerning the triggering of different stutter edit gestures.

Upon launching a single user embodiment of the application software, the user is shown the title screen FIG. 1 immediately followed by an image FIG. 2 illustrating the use of the host device's accelerometer as a means of input to the software. During this time loading of the audio content preferably has already begun such that one or more default (or previously selected) audio tracks will be ready for immediate playback.

Figure 3:
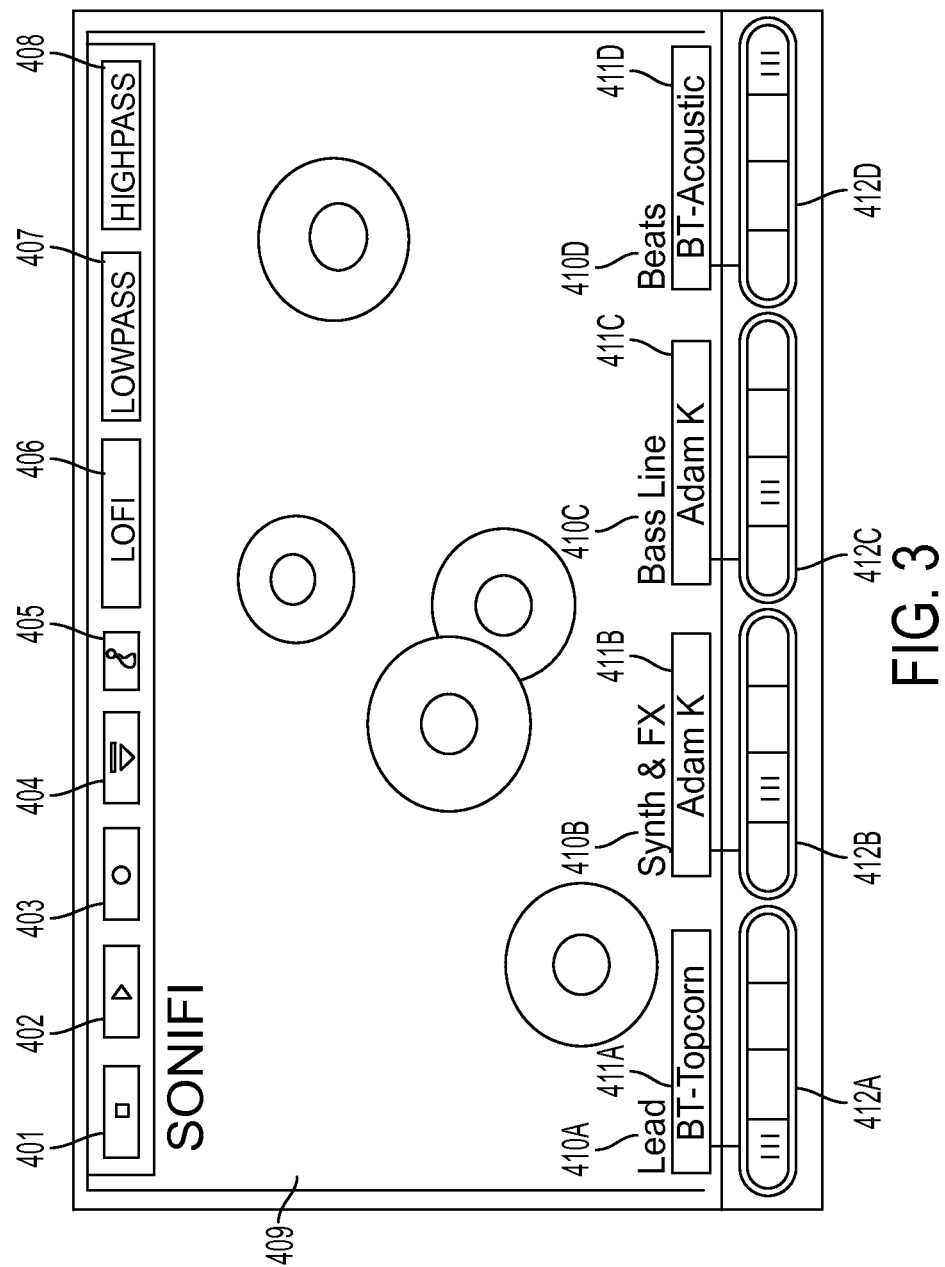
FIG. 3 shows an exemplary graphical user interface of a presently preferred embodiment of a system currently in use.
Figure 4:
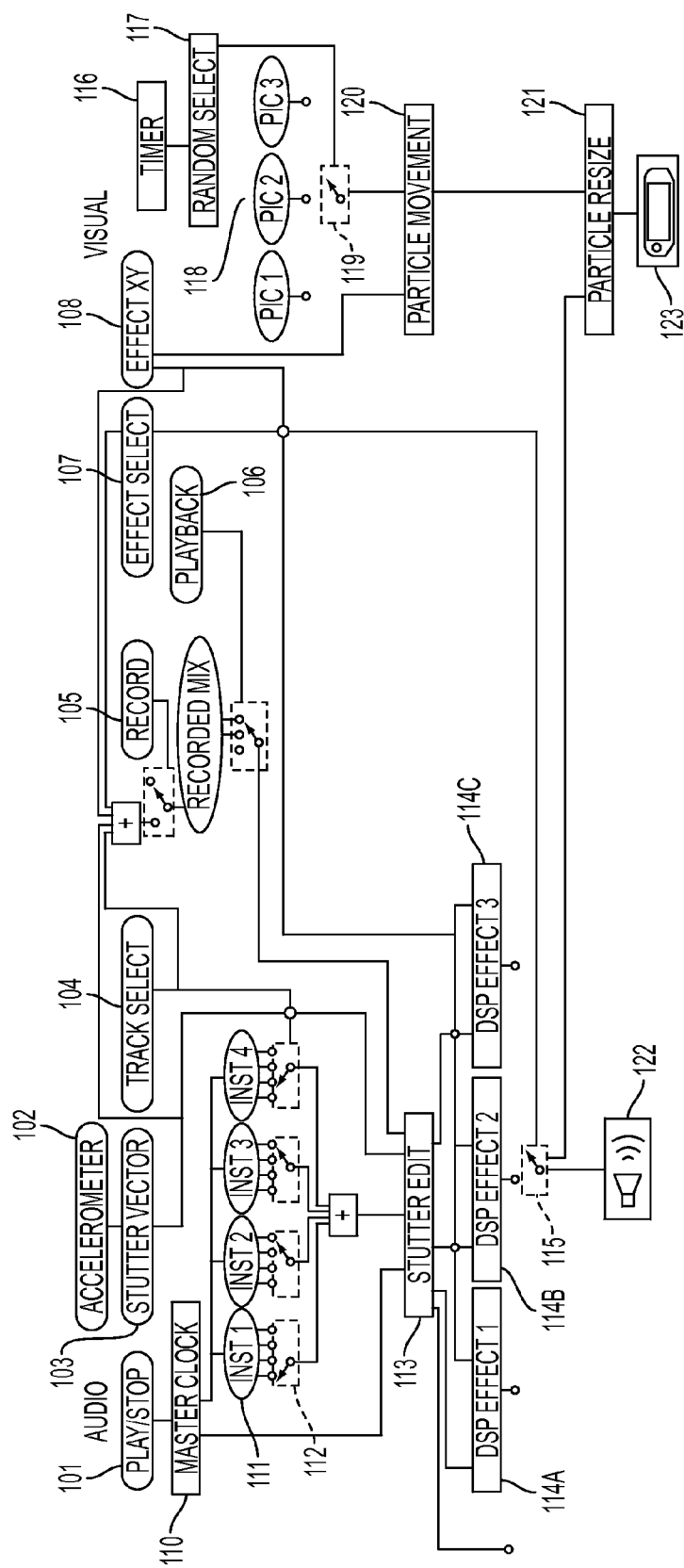
FIG. 4 is a system block diagram of the principal hardware and software components of an exemplary implementation of one presently preferred embodiment.

When this is complete the software progresses to the main screen, shown in FIG. 3. In the preferred embodiment, the graphical user interface shown in FIG. 3 serves as a means to control the processes of the software, diagrammed in FIG. 4. At this point the user may choose to initiate playback of the original composition by touching the play button 402. In the block diagram this is represented by Play/Stop 101 and starts the Master Clock 110. Informed by the clock the serves a diagram of the musical composition, indicating which audio files should be played at any given time in order that the composition be realized as intended.

It is important to note that as most musical compositions contain substantial repetition within at least some of the component parts, such a "composition map" can act as a disk space-saving tool, in that a repeated section of a particular part can simply reference the same audio data as the first instance of the section. Moreover, the smaller size of the data package potentially increases the speed and decreases the cost of downloading the software (or additional compositions to be used by the software). Furthermore the audio data in each section is preferably compressed, and decoded in real time as needed, as a further space-saving measure. In that regard, it is preferable that not only the section currently being performed be decoded in realtime, but also that the decoding of the next section be commenced before the end of the current section in sufficient time to avoid any unwanted gaps or "glitches" between sections.

At this point the user may choose to exercise the system's track selection functionality 112 to swap out the currently active version of a particular musical part for an alternative version. The graphical interface shows the array of possibilities available to the user. The four parts comprising the composition are labeled, 410A, 410B, 410C, and 410D. Below these are shown the names of the currently playing versions (tracks) of those parts, 411A, 411B, 411C, and 411D. Each currently playing part version is also represented by the position of the sliders 412A, 412B, 412C, and 412D. Should the user for example move the slider 412A into the second of the four positions by touching it and dragging it there, a transition to another version of the Lead part will occur. The corresponding new audio data will be stored in accordance with the composition map.

However, the change from one version to the next may not take place immediately but only when two conditions have been met. The first condition is that the clock has reached a value which is evenly divisible by the length of one measure, given the current tempo of the music. This tempo defines not only the number of beats (rhythmic pulses) occurring in one minute ("BPM") for the given composition, and may be either a global value that is the same for all sections of the map, or may be separately stored for each section. The length of a measure in one version to another version that always occurs at a musically relevant value (preferably at the beginning of the next measure), in accordance with the timing output by the master clock. The second condition is that the software has had enough time to decode the audio data associated with the upcoming version such that its playback may begin without glitching. Depending on the complexity of the compression and the available computational resources, any further delays imposed by that second condition which could otherwise result in delaying the transition by at least one full measure could in certain alternative embodiments be avoided by simultaneously decoding the corresponding next section of all available versions. Moreover, if the available storage is very limited and a particularly computationally complex data compression process is required, then the stored audio data could be organized into individually stored smaller sections each having a length of only one measure, so that the same computational resources are required regardless of the source of the next measure.

The user may explore hundreds of combinations of the parts' component versions and effectively create their own composition this way. In addition, the user may choose to drag the slider completely to the left or right of its track, in which case the part is said to be muted, and will transition to silence on the start of the next measure.

Another means in the preferred embodiment for superimposing effects on the audio is by the use of a host device's accelerometer 102 to initiate a stutter edit effect. When the user moves the device and the accelerometer first reaches a certain threshold, the cardinal direction (up, down, left, right, forward, back relative to the device being held by the user with the display in its normal horizontal viewing position as shown in FIG. 2) registering the greatest positive movement will be derived by the software 103. This determines which one of six preset stutter gestures will be triggered and when, and further inputs from the accelerometer is ignored until after the triggered stutter gesture has ended. A stutter gesture, like a version transition, will not take place until the clock reaches a value divisible by the length of one beat, and the fact that all preset gesture lengths are in whole numbers of beats ensures that stutter gestures end on beat as well.

These stutter edit gestures preferably define not only when the triggered stutter edit of the current audio sample in the stutter slice buffer, the stutter slice repetition rate (which preferably has separate defined start and end values and gives the stutter effect a time varying frequency modulation), the stutter slice volume (which preferably has separate defined start and end values and gives the stutter effect a time varying amplitude modulation), and the stutter slice audible gate width relative to the repetition rate (which gives the stutter effect a "staccato" sound and preferably also has separate defined start and end values), In one preferred embodiment, six different available gestures are defined as follows (unless stated otherwise, detection of the trigger determines the measure in which the stutter effect occurs and the start time of the stutter gesture):

UP: Start and end volume at full, starting at 16th notes and ramping to 256th notes, start and end stutter gate fully open, manual buffer position mode from beat 1, gesture length is "until next downbeat"

DOWN: Start volume 90% and ending at full volume, starting note length 128th notes and ramping down to 8th notes, stutter gate starts at 70% and ends at 100%, manual buffer position mode from beat 1, gesture length is until next downbeat.

LEFT: Start and end full volume, start and end note length 32nd notes, starting stutter gate at 60% and moving to fully open, buffer position mode is manual from beat 2, gesture length is two 16th notes.

RIGHT: Start full volume and ending at 40%, starting and end note length is 16th notes, starting stutter gate fully open and going down to 20%, buffer position mode is follow using a grid of 8th notes, gesture length is until next downbeat.

FORWARD: Starting at 80% volume and reaching full volume by the end, starting at 16th notes and ending at 32nd notes, starting at 30% stutter gate and ending fully open, buffer position mode is manual from beat 1, gesture length is until next downbeat.

BACK: Starting at 80% volume and reaching full volume by the end, starting and ending note lengths is 32nd notes, stutter gate starts at 80% and ends at 40%, buffer position mode is follow and the gesture length is a quarter note.

Further manipulation of audio in the system is offered by three DSP effects, shown in the block diagram as 114A, 114B, and 114C. The user initiates these by touching buttons 406, screen 409 will act as a control surface 108 for the effect's parameter, the sample rate. The position of the user's finger from left to right on the screen will determine, from low quality to full quality, the simulated sample rate of the audio. In addition the user may choose to enable either Highpass 407 or Lowpass 408, which enable a highpass filter and lowpass filter respectively. These types of filters have two real time parameters, cutoff and resonance. Cutoff, which determines the frequency bounds of the filter, can be controlled along the X axis the same as sample rate was controlled using LoFi. Resonance, the amplitude of the boost at the cutoff frequency, can be controlled along the Y axis. From the effects section the audio in the system proceeds to the output 122.

Another noteworthy feature of the preferred embodiment is its ability to record the details of both version transitions and effect parameters, including the triggering of stutter gestures, so that the remixed performance can be repeated at any time by either the user or his associates. Record 105 is enabled by touching the record button 403. When enabled, the timing of each transition (preferably in a format that uniquely identifies both a particular measure and a particular beat within that measure) and all effects input is stored in a file, which can be saved and named by the user upon completion of the composition or by pressing stop 401.

When stopped, playback of a user recording may begin when the user presses load 404 and then play 402. When a saved mix file is retrieved, it preferably will show the file name at the beginning for 3 seconds (1 sec fade in 1 sec stay, and 1 sec fade out). The playback including any previous transition and effect information is now initially established by original data file as modified by the recording. Should the user load a recording, press record, and then play, any transitions already in the recording are preserved but can be modified during playback and different or additional effects may be applied in real time to the previous recording, which in turn results in a new recording. This provides an overdub function, whereby an overdubbed mix may be created from the previous remix file.

Lastly, the system features a visualizer shown in the main area of the screen 409. The visualizer operates in several modes 118, which are selected by a random number generator 117 after a timer 116 has reached a certain threshold. The mode determines the images used for particles in the visualizer, and the particle movement algorithm 120 determines their movement certain intervals. If they approach the edge of the screen a new acceleration is applied such that the particle goes in the opposite direction. Touching the screen as when applying an effect has the effect of shrinking those borders down to a point, the point that is being touched, so that all particles are constantly changing acceleration in order to head back toward the point. The particle resize algorithm 121 determines the size of each particle. The size of the particle may be directly proportional to the audio power at any given moment.

Figure 5:
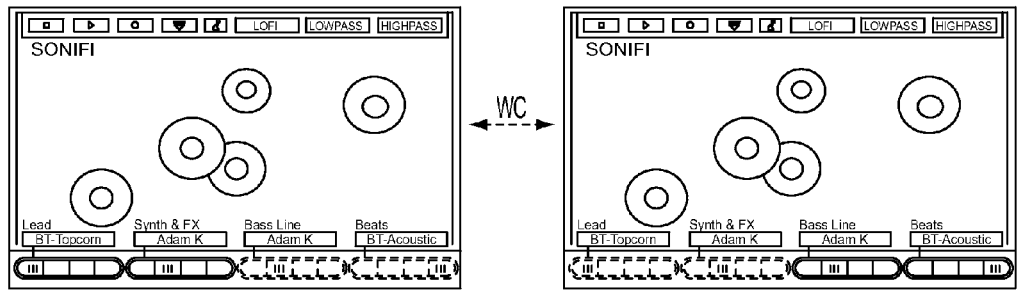
FIG. 5 is a schematic diagram of a two user system using wirelessly connected devices similar to those shown in FIG. 1.
Figure 6:
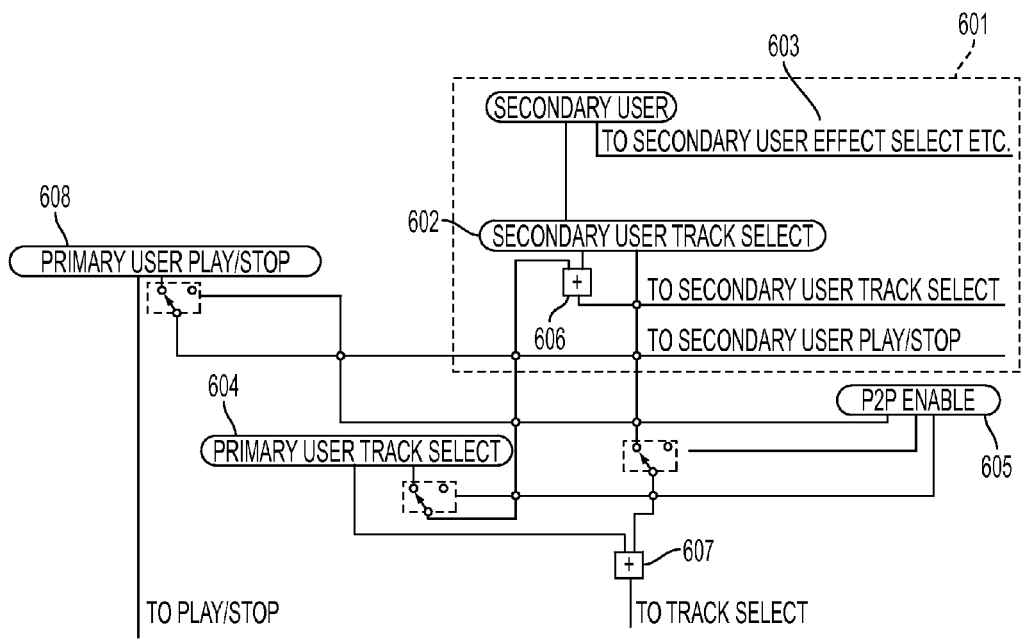
FIG. 6 represents a modification to the system block diagram of FIG. 4 to accommodate additional user inputs.

In another embodiment, the peer to peer ("P2P") functionality of iPhone OS 3.0 permits the required user inputs to come from two separate devices simultaneously, for example using the iPhone's built in Bluetooth wireless communication capability. When this feature is enabled the two devices are said to be "linked", as shown in FIG. 5. FIG. 6 represents an extension of FIG. 4 when peer-to-peer capabilities are enabled, with the area within the dotted line representing a second device. The secondary user 701 has control over a limited number of parts of the music 702 (see also FIG. 5, which provides each user with a different set of active track selection sliders 412), which may be determined in advance by the stored audio data, or selected manually when the secondary user is linked to the primary user. The secondary user's choices are sent to the primary user's device and combined 707 with the primary user's track selections 704. This accounts for all track selections on the primary user's device. The primary user's track selections may in turn sent to the secondary device and likewise combined 706 so that the secondary users track selection data is now identical to the primary's. However, because of the delays and possible data losses and retransmissions inherent in any asynchronous wireless communications system, the transmissions are preferably timestamped in accordance with a common clock, which enables current delay latency to be estimated whereby each user device can wait for a sufficient time to permit any remote commands to be received and processed that should be implemented synchronously with the pending local commands. Each user may have control over their own effects 703, which preferably are only applied to the tracks (parts) controlled by that particular user. Play and stop 708 may be controlled for both devices by the primary user, or each user may record the shared version for his own use in the event the other user is no longer available. Those skilled in the art will doubtless be willing and able to modify these teachings for other configurations involving more than one device or more than one user.

In other embodiments that do not have convenient access to the presently preferred touch-screen and accelerometer capabilities, alternative user input means could include typed key pad entries, finger gestures (touches), combinations or sequences of buttons, voice commands and audio signals, MIDI messages, or control by a standard input device such as a mouse. Other ways to organize tracks include vocal range, type of instrument, etc. Track switching and effects in could be augmented by a form of artificial intelligence or controlled by random selection, for example with the user specifying the time but not the nature of the effect, or vice versa. The available versions could be expanded beyond the parts of one composition to the parts from many compositions. Audio data could be replaced by an incoming audio stream, such as from a microphone. In any event, it is believed that the basic elements have been provided for constructing a new and creative tool that will find many applications in the performing arts.

The invention claimed is:

1. A realtime system for performance of a remixed version of audio data representing multiple parts of an original composition and organized as a plurality of individual original tracks each representing a different part and having shared beats and measures defining a common tempo to be used to synchronize the individual tracks to thereby re-create the original composition, the system comprising:
   a respective plurality of stored alternative audio tracks for each of several related parts of the original composition, each alternative track being synchronized in tempo with a corresponding track of the original composition;
   a respective plurality of stored parameters for each of several defined effects;
   track selection means for independently selecting a particular alternative track to be swapped out for a corresponding original track at a designated transition point during a performance of the original composition; and
   effects selection means for independently selecting a particular defined effect to be applied at a designated insertion point during the performance of the original composition, wherein the defined effects include at least three different stutter gestures, each gesture being selectable by movement of a user input device in a respective different cardinal direction.

2. The system of claim 1, wherein the defined effects also include at least one DSP effect selected from the group consisting essentially of LoFi effects, lowbandpass filter effects, and highbandpass filter effects.

3. The system of claim 2, wherein said DSP effect has at least one user variable parameter.

4. The system of claim 3, wherein said user variable parameter is input from a touchscreen display.

5. The system claim 2, wherein said DSP effect has at least two independent user variable parameters that are input from a xy keypad.

6. The system of claim 1, wherein the defined effects also include at least one LoFi effect, at least one lowbandpass filter effect, and at least one highbandpass filter effect.

7. The system of claim 1, wherein at least some of the effects incorporated in said gesture vary over the gesture length in accordance with respective user-defined start and end points.

8. The system of claim 1, further comprising a display screen and a visualizer module responsive to the audio output.

9. The system of claim 8, connected wirelessly to a second such system to produce a common audio output in accordance with user inputs from both systems, wherein said visualizer module is responsive to said common audio output.

10. The system of claim 9, in which certain user functions can only be performed on the first system and other user functions can only be performed on the second system.

11. The system of claim 9 implemented in a pair of handheld portable electronic devices that each includes a stored library of musical material including original and alternative versions of each of several different components of a common original musical composition, an audio playback subsystem, a video display subsystem, a movement sensitive user input device, and a graphic user control interface.

12. The system of claim 1, further comprising a display screen and a visualizer module responsive to the user input.

13. The system of claim 1, further comprising a display screen and a visualizer module simultaneously responsive to both the audio output and the user input.

14. The system of claim 1, further comprising recording means for capturing and recreating the remixed version.

15. The system of claim 14, further comprising playback means for performing a recorded copy of the remixed version at a later time.

16. The system of claim 14, further comprising overdubbing means for retrieving a recorded copy of the remixed version and adding additional track transitions and digital effects.

* * * * *